(12) United States Patent
Moller

(10) Patent No.: US 6,450,445 B1
(45) Date of Patent: Sep. 17, 2002

(54) STABILIZING CONTROL APPARATUS FOR ROBTIC OR REMOTELY CONTROLLED FLYING PLATFORM

(75) Inventor: Paul S. Moller, Davis, CA (US)

(73) Assignee: Moller International, Inc., Davis, CA (US)

( * ) Notice: Subject to any disclaimer, the term of this patent is extended or adjusted under 35 U.S.C. 154(b) by 0 days.

(21) Appl. No.: 09/868,008
(22) PCT Filed: Dec. 10, 1999
(86) PCT No.: PCT/US99/30392
§ 371 (c)(1),
(2), (4) Date: Oct. 12, 2001
(87) PCT Pub. No.: WO00/40464
PCT Pub. Date: Jul. 13, 2000

Related U.S. Application Data

(60) Provisional application No. 60/111,843, filed on Dec. 11, 1998.

(51) Int. Cl.⁷ .......................... B64C 29/00; B64C 15/00; B64C 25/30
(52) U.S. Cl. ................. 244/23 A; 244/23 B; 244/23 C; 244/12.1; 244/12.2; 244/12.4; 244/12.5; 244/12.6; 244/67; 244/185; 244/186; 244/190; 244/82; 244/76 A
(58) Field of Search .......................... 244/23 A, 23 B, 244/23 C, 12.1, 12.2, 12.4, 12.5, 12.6, 67, 185, 186, 190, 82, 76 A

(56) References Cited

U.S. PATENT DOCUMENTS

| | | | | |
|---|---|---|---|---|
| 370,285 A | * | 9/1887 | Ferri | 301/77 |
| 2,377,835 A | * | 6/1945 | Weygers | 244/23 C |
| 2,863,621 A | * | 12/1958 | Davis | 244/23 C |
| 2,929,580 A | * | 3/1960 | Ciolkoxz | 244/12.5 |
| 3,054,578 A | * | 9/1962 | Brocard | 244/23 C |
| 3,101,917 A | * | 8/1963 | Sudrow | 244/23 C |
| 3,103,327 A | * | 9/1963 | Parry | 244/17.19 |
| 3,128,062 A | * | 4/1964 | Brocard | 244/23 C |
| 3,135,481 A | * | 6/1964 | Sudrow | 244/23 C |
| 3,395,876 A | * | 8/1968 | Green | 244/17.11 |
| 3,532,303 A | * | 10/1970 | Farkas | 244/23 C |
| 3,537,669 A | * | 11/1970 | Modesti | 244/1 R |
| 3,568,358 A | * | 3/1971 | Bruce | 244/23 C |

(List continued on next page.)

Primary Examiner—Charles T. Jordan
Assistant Examiner—Stephen A. Holzen
(74) Attorney, Agent, or Firm—Oppenheimer Wolff & Donnelly LLP; Claude A. S. Hamrick

(57) ABSTRACT

A robotic or remotely controlled flying platform (10) with reduced drag stabilizing control apparatus constructed having an air duct (12) with an air intake (14) on the top and an exhaust (16) at the bottom, containing supported therein a clockwise rotating fan (22) and a counter-clockwise rotating fan (24). Directly below the perimeter of the air duct exhaust are mounted a plurality of trough shaped air deflection assemblies (32) each including a rotatably adjustable half trough (44) for selectively scooping a portion of the drive air, and a stationary adjacent half trough (36) for receiving the scooped drive air and redirecting it outward and upward from the air duct. A centrally positioned plate (112) has a plurality of rods (106), each pivotally connected between the plate (74) and a corresponding lever associated with each of the adjustable half troughs (44) so as to couple the adjustable half trough (44) in or out of the drive air steam according to the position of the plate (74), thereby providing control over the pitch and roll of the flying platform. The plate is driven by first and second motors responding to input control signals. The control signals also direct the yaw of the flying platform by selectively providing independent speed control to each of the clockwise and counter clockwise fan motors resulting in duct rotation in a clockwise or counter clockwise direction accordingly.

15 Claims, 5 Drawing Sheets

U.S. PATENT DOCUMENTS

| | | | | |
|---|---|---|---|---|
| 3,630,470 A | * | 12/1971 | Elliott | 244/12.2 |
| 3,677,503 A | * | 7/1972 | Freeman, Jr. | 244/23 C |
| 3,680,316 A | * | 8/1972 | Pakendorf | 244/23 A |
| 3,697,020 A | * | 10/1972 | Thompson | 244/12.2 |
| 3,833,187 A | * | 9/1974 | Kahler et al. | 239/265.27 |
| 3,838,835 A | * | 10/1974 | Kling | 244/23 C |
| 4,050,652 A | * | 9/1977 | DeToia | 244/12.2 |
| 4,196,877 A | * | 4/1980 | Mutrux | 244/12.2 |
| 4,795,111 A | * | 1/1989 | Moller | 244/100 R |
| 4,955,962 A | * | 9/1990 | Mell | 137/263 |
| 5,035,377 A | * | 7/1991 | Buchelt | 244/12.1 |
| 5,058,824 A | * | 10/1991 | Cycon et al. | 244/17.13 |
| 5,064,143 A | * | 11/1991 | Bucher | 244/12.2 |
| 5,103,634 A | * | 4/1992 | Harrison et al. | 239/265.33 |
| 5,152,478 A | * | 10/1992 | Cycon et al. | 244/12.2 |
| 5,170,963 A | * | 12/1992 | Beck, Jr, | 244/73 C |
| 5,226,350 A | * | 7/1993 | Cycon et al. | 192/48.92 |
| 5,303,879 A | * | 4/1994 | Bucher | 244/12.2 |
| 5,340,279 A | * | 8/1994 | Cycon et al. | 416/134 A |
| 5,344,100 A | * | 9/1994 | Jaikaran | 244/12.2 |
| 5,351,913 A | * | 10/1994 | Cycon et al. | 244/12.2 |
| 5,575,438 A | * | 11/1996 | McGonigle et al. | 244/118.1 |
| 5,615,834 A | * | 4/1997 | Osman | 239/265.19 |
| 5,653,404 A | * | 8/1997 | Ploshkin | 244/12.2 |
| 5,746,390 A | * | 5/1998 | Chiappetta | 216/101 |
| D418,805 S | * | 1/2000 | Cycon et al. | 244/12.3 |
| 6,050,520 A | * | 4/2000 | Kirla | 244/10 |
| 6,086,016 A | * | 7/2000 | Meek | 244/17.11 |
| 6,170,778 B1 | * | 1/2001 | Cycon et al. | 244/12.3 |
| 6,382,560 B1 | * | 5/2001 | Ow | 244/12.2 |
| 6,270,036 B1 | * | 8/2001 | Lowe, Jr. | 244/12.2 |
| 6,270,038 B1 | * | 8/2001 | Cycon et al. | 244/12.2 |
| 6,302,229 B1 | * | 10/2001 | Triebel | 244/23 C |
| 6,311,928 B1 | * | 11/2001 | Presz et al. | 239/265.29 |
| 6,352,219 B1 | * | 3/2002 | Zelic | 244/12.1 |

* cited by examiner

STABILIZING CONTROL APPARATUS FOR ROBTIC OR REMOTELY CONTROLLED FLYING PLATFORM

This application claims the benefit of provisional application Serial No. 60/111,843, filed Dec. 11, 1998.

FIELD OF THE INVENTION

The present invention relates generally to a flying platform which may be robotic or remotely controlled, and particularly to apparatus for controlling the attitude of a platform in flight employing positionable trough shaped air deflectors.

BRIEF DESCRIPTION OF THE PRIOR ART

A flying platform is disclosed in U.S. Pat. No. 4,795,111 by Moller including one or more ducted fans, each duct having adjustable vanes oriented generally in a vertical direction. Adjustable spoilers are shown positioned between vanes and provide for control of pitch and roll. The vanes are adjustable so as to direct the air flow in a sideways direction providing impetus for horizontal flight. The overall configuration of this invention provides a relatively narrow profile having low aerodynamic drag, which is desirable for horizontal flight operations. However, the spoilers cause a reduction in the air flow which reduces the lift capacity.

A design that optimizes the efficiency in stationary hovering and low speed lateral motion would be highly desirable. Also, the mechanical control mechanism employed is complex, employing a combination of multiple spoilers for pitch and roll control with separate vanes for yaw control. A simpler design could substantially reduce production cost and increase reliability.

SUMMARY OF THE INVENTION

It is therefore an object of the present invention to provide an efficient attitude control apparatus for a flying platform.

It is a further object of the present invention to provide a flying platform with an attitude control apparatus having reduced mechanical complexity.

It is a still further object of the present invention to provide a flying platform with an attitude control apparatus having substantial control redundancy.

Briefly, a preferred embodiment of the present invention includes a flying platform constructed from an air duct with an air intake on the top and an exhaust at the bottom, having supported therein a clockwise rotating fan and a counter-clockwise rotating fan. Directly below the perimeter of the air duct exhaust are mounted a plurality of trough shaped air deflection assemblies each including a rotatably adjustable deflector of half trough shape for selectively scooping a portion of the drive air, and an adjacent stationary deflector of half trough shape for receiving the scooped drive air and redirecting it outward and upward from the air duct. A centrally positioned plate has a plurality of rods, each pivotably connected between the plate and a corresponding lever associated with each of the adjustable deflectors so as to couple the adjustable deflectors in or out of the drive air stream according to the position of the plate, thereby providing control over the pitch and roll of the flying platform. The plate is driven by first and second motors responding to input control signals. The control signals also direct the yaw of the flying platform by selectively providing independent speed control to each of the clockwise and counter clockwise fan motors resulting in duct rotation in a clock wise or counter clockwise direction accordingly.

An advantage of the present invention is that the improved control apparatus results in reduced drag presented to the drive air flow resulting in increased lift efficiency.

A further advantage of the present invention is that the reduction of mechanical complexity reduces production cost and increases reliability.

A still further advantage of the present invention is the provision of a substantial control redundancy resulting in a reduction in the probability of catastrophic failure.

IN THE DRAWING

DESCRIPTION OF THE PREFERRED EMBODIMENT

Figure 1:
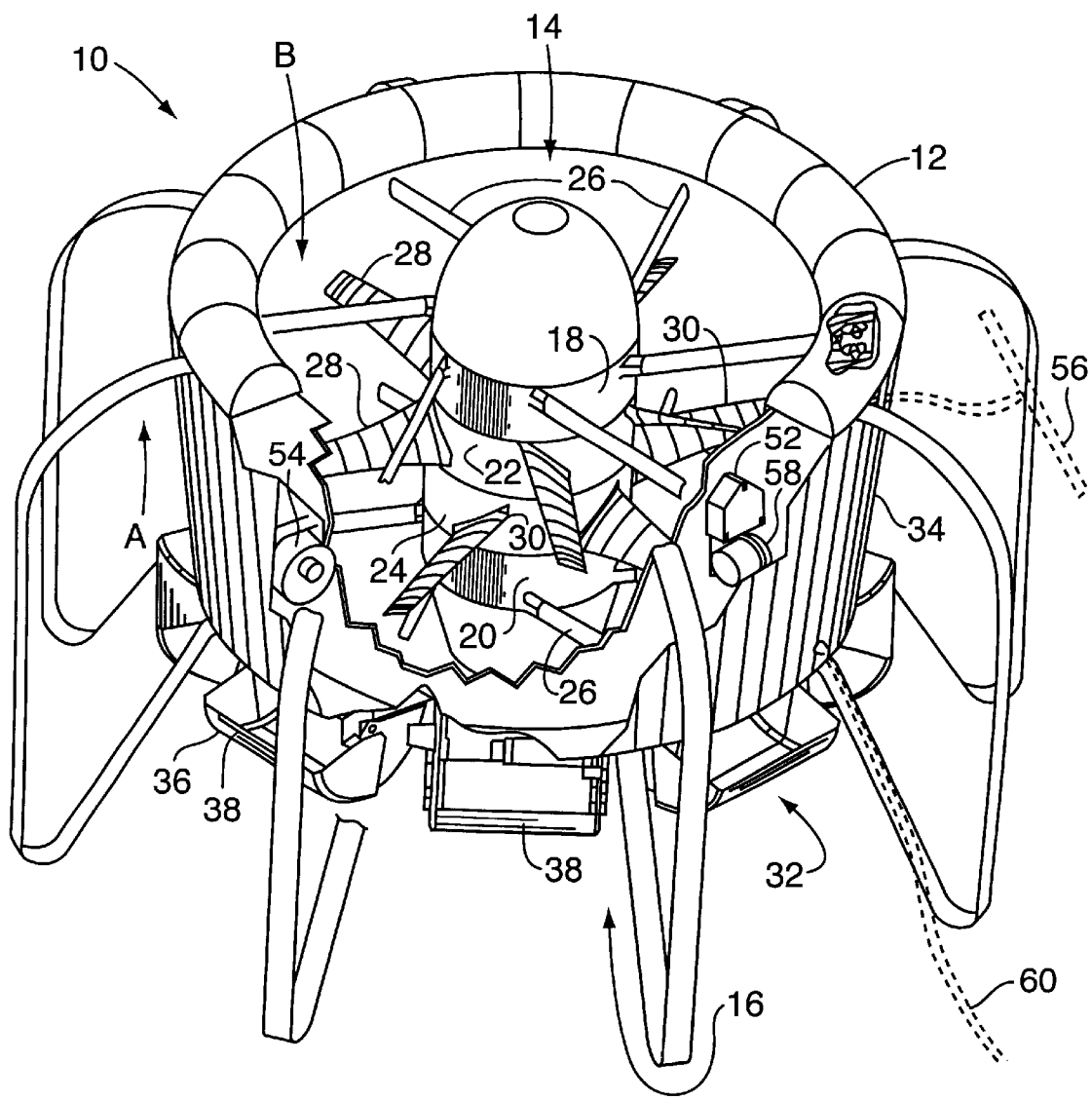
FIG. 1 is an illustration of a VTOL aircraft with multiple adjustable air deflector assemblies.

Referring now to FIG. 1 of the drawing there is shown a vertical take-off and landing (VTOL) aircraft 10 having an air duct 12 with an intake 14 on the top and an exhaust 16 on the bottom. A plurality of landing supports 13 are shown attached to the duct. A first motor 18 and second motor 20 are mounted coaxially within the duct 12 for driving first and second fans 22 and 24 respectively. The motors 18 and 20 are suspended by engine supports 26 connected between the duct 12 and the motors 18 and 20. The first fan 22 has a plurality of fan blades 28 which are shown configured so as to pull "drive" air from the intake 14 and expel it out the exhaust 16 when empowered by the first motor 18. Similarly, the second fan 24 has a plurality of blades 30 which are configured to pull "drive" air from the intake 14 and expel it out the exhaust 16 when driven by the second motor in a counter clockwise direction.

A number of adjustable trough shaped air deflector assemblies 32 are shown mounted in a circular array below the duct wall 34. Each assembly 22 has a stationary deflector 36 having a quarter cylinder shaped bottom 38 with quarter disk shaped ends 40, shown mounted with brackets 42 to the bottom of the wall 34. A similarly shaped adjustable deflector 44 is shown mounted pivotably at locations such as 46 to each of the stationary deflectors 36.

Figure 2:
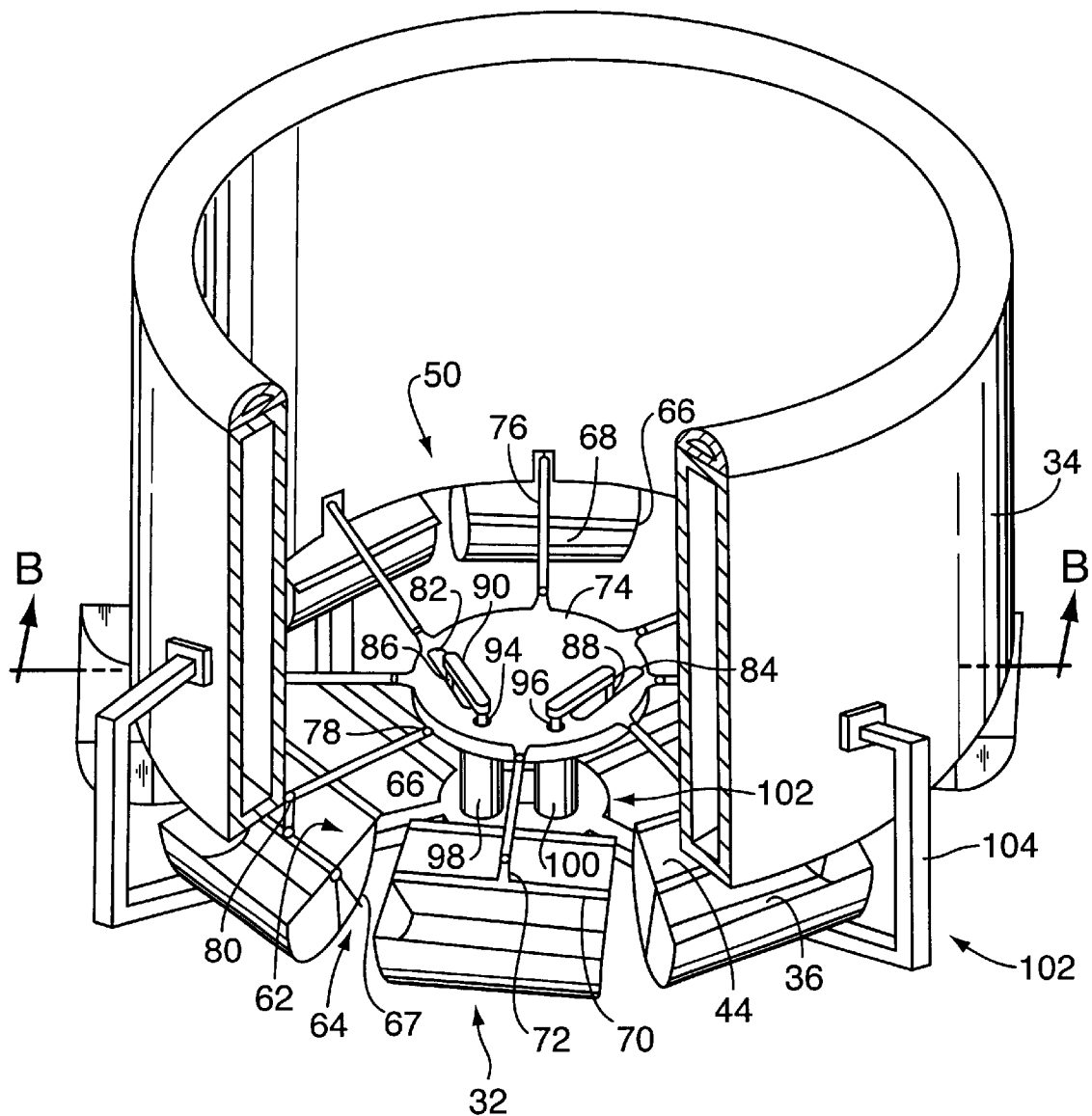
FIG. 2 shows the detail of a deflector control assembly driven by two servo motors.
Figure 3:
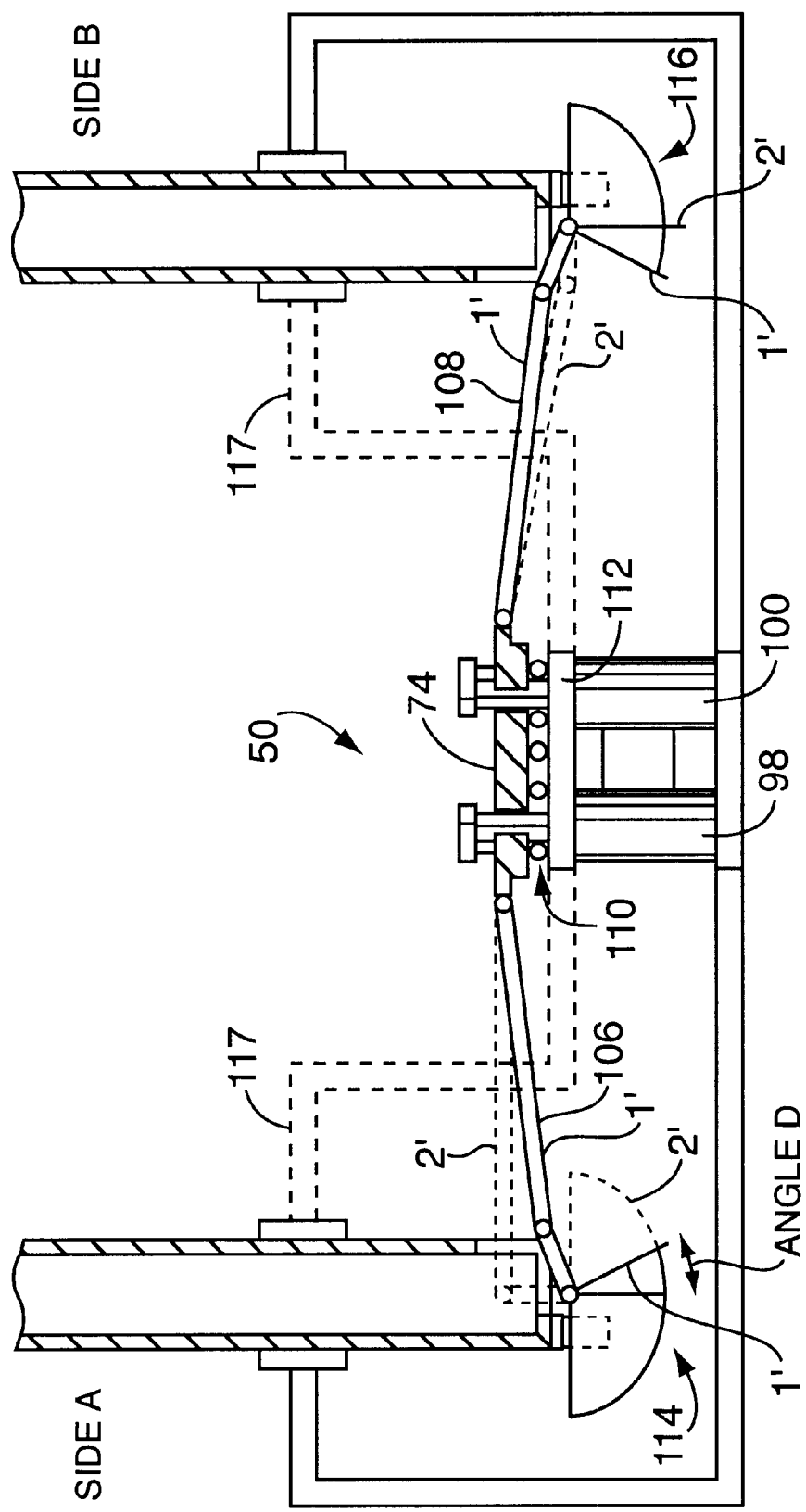
FIG. 3 is a more detailed illustration of the deflector control assembly of FIG. 2.
Figure 5:
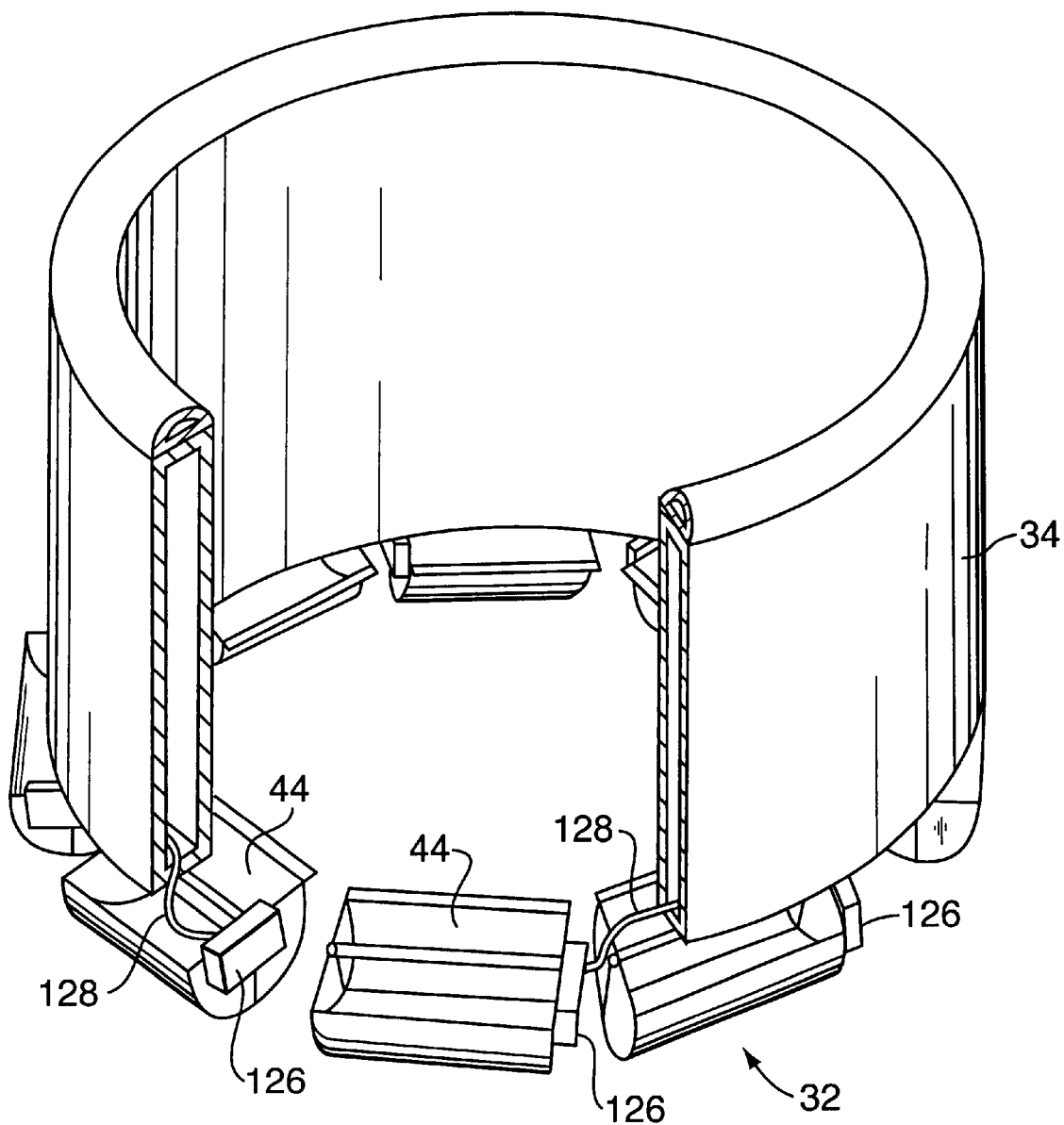
FIG. 5 illustrates the use of individual servo motors for each of a plurality of air deflector assemblies as shown in FIG. 1.

The adjustable deflectors are positioned by a deflector control assembly 50 shown in FIGS. 2 and 3 or by individual servo motors for each adjustable assembly 32 shown in FIG. 5.

The adjustment of the deflector assemblies 32 achieve control of "roll" and "pitch" of the VTOL aircraft, and control of the speed and relative speed of fans 22 and 24 control "lift" and "yaw". There is a flight computer 52 which converts input signals to control signals for driving the first and second motors 18 and 20 and the deflector assemblies 32. The flight computer 52 receives and processes input from attitude sensor 54, and/or input can be received from a remote transmitter (not shown) by antenna 56, which is then converted by receiver 58 for input to computer 52. Alternatively, an electrical tether cable 60 can be used to pass input signals from a remotely located operator (not shown) to the computer 52.

The VTOL aircraft is propelled by the two ducted fans 22 and 24 which pull air into the duct from the top intake 14 and propel it downward to the exhaust 16 with sufficient thrust to exceed the weight of the VTOL aircraft and thereby cause it to rise. Yaw control i.e., around a vertical axis coincident with the axis of the duct 12 and motors 18 and 20 and fans 22 and 24, is provided by the independent differential control of the two motors (or engines) 18 and 20 and their respective fans 22 and 24. This allows an operator to achieve differential torque in either direction around the vertical axis, causing the vehicle to rotate, while maintaining the necessary thrust to achieve the commanded rate of climb or descent, or to maintain altitude.

Referring now to both FIGS. 1 and 2, pitch and roll are controlled by the air deflector assemblies 32 at the bottom exhaust end of the duct. Each assembly 32 has a length somewhat less than the duct circumference divided by the number of assemblies 32. The adjustable deflector 44 is positionable from a fully deployed position (as shown at 62 in FIG. 2) protruding into the interior of the duct so as to intercept and deflect a maximum of drive air passing therethrough, to a position fully retracted into the stationary deflector intercepting no drive air, such as at the dotted line 64 in FIG. 2. A leading lip 66 of the adjustable deflector is extended as shown from the cylindrical diameter 67 for the purpose of assuring that the airflow separates from the back side (such as at 68) of the adjustable deflector 44. The lip 66 keeps the line of separation of air flow from changing in an unpredictable manner as the deflector 44 moves which would cause the effective air thrust to change inconsistently, thus creating a stability problem. The function of the stationary deflectors 36 is to continue the turning of the air, which was begun by the adjustable deflector 44, to an angle of approximately 170 degrees (arrow A, FIG. 1) from the original downward direction (arrow B, FIG. 1). The air does not have to be turned a full 180 degrees, since the "moment" that is exerted on the duct 12 is almost at a maximum using approximately 170 degrees of turning. It is desirable, however, for the angle of turning of the airflow to be as large as possible. If the airflow were to be diverted outward, and not redirected upward, there would be a lateral force on the aircraft which would cause the aircraft to be vectored laterally, rather than to have only a controlling torque generated about its center of gravity. In this system, the drive air is not only diverted from exiting in a downward manner, it is exited upward, which further enhances the control torque available. This aspect of the invention will be more fully described in relation to the description of FIG. 3.

Yaw control is provided by the independent control of the two fan motors 18 and 20. The first fan 22 creates a circumferential swirling motion in the air which is then removed by the second fan 24 under normal flight circumstances. If the speeds of the fans are such that this swirl is not completely eliminated before the air is exhausted out of the duct 12, the aircraft will have a yaw moment. This effect is exploited by the flight control computer 52 to react to operator commands for yaw control by supplying the necessary control signals to drive the motors 18 and 20. A further advantage of the use of two motors is added safety, in that if one motor fails, the other motor has the capacity to bring the VTOL aircraft down in a controlled, automatically stabilized manner, avoiding a catastrophic free-fall landing. With only one motor operating, there is an unbalanced yaw torque applied to the aircraft, but the rotational inertia of the aircraft, in conjunction with a tail rudder (not shown), will limit the rotational velocity of the aircraft during descent.

Referring again to FIG. 2, there is an illustration of a deflector control assembly 50, referred to but not described in relation to FIG. 1. The figure shows the air duct 12 and deflector assemblies 32, omitting the other parts shown in FIG. 1 for clarity of illustration. Each deflector assembly 32 is shown to have a pivot rod 70 with a lever arm 72 mounted thereon. The assembly 50 has a plate 74 interconnected with the deflector assemblies 32 by push-pull rods 76 connected by ball joints 78 and 80 to the plate 74 and the end of each lever arm 72. The plate 74 has two slots 82 and 84 therein, orthogonally oriented to each other providing guidance for pins 86 and 88, each connected at one end of arms 90 and 92 being driven at an opposite end by drive shafts 94 and 96 of servo motors 98 and 100. The servo motors 98 and 100 are mounted to a bearing plate (item 112 in FIG. 3) upon which the plate 74 slides, and to a support assembly 102 with support arms 104 suspending the assembly 50 from the duct walls 34.

The servo motors 98 and 100 selectively rotate the arms 90 and 92 to position the plate 74 relative to the air duct wall 34, causing the push-pull rods 76 to either push on a lever arm 72 resulting in an adjustable deflector to rotate inward and upward to collect more drive air, or pull on a lever arm 72 causing the deflector to rotate down and outward into the stationary deflector away from the air stream.

FIG. 3 is a cross sectional view such as B—B of FIG. 2 showing two opposing push-pull rods 106 and 108, and illustrating a bearing assembly 110 between plate 74 and the bearing plate 112 attached to the motors 98 and 100. With push-pull rod 106 and 108 in positions 1 and 1', the two adjustable deflectors 114 and 116 are at equal extensions as shown in positions 1 and 1'. In this position the aircraft would not experience any control force causing roll or pitch. With the plate 74 in a second position (not shown), the rods 106 and 108 would be in a second position 2', causing the deflector 114 to be fully extended and 116 to be fully retracted resulting in a strong drag due to deflector 114 reducing the lift power at side A relative to side B forcing side B upward relative to side A causing a pitch or roll of the aircraft. Because of a non-linear relationship between the angle of the adjustable deflector 114, 116 or 44 (in general) and the amount of air deflected, the optimum position for the adjustable deflectors with the plate 76 in a centered position is at an angle D equal to about 30 degrees from fully retracted. The dashed lines 117 indicate an alternative placement of supports for the bearing plate and motors 98 and 100 attached thereto.

Figure 4:
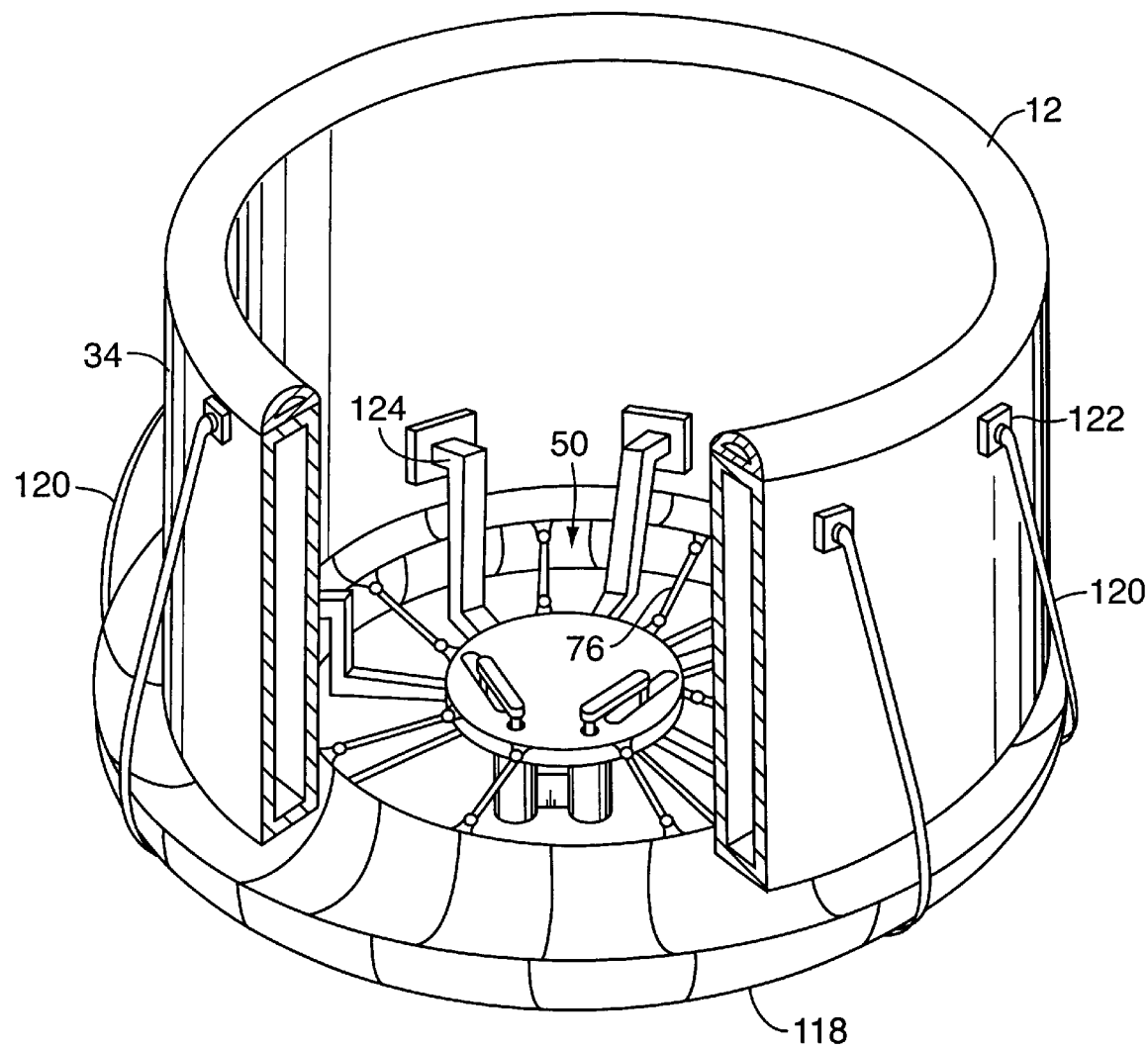
FIG. 4 illustrates the use of a half toroidal shaped trough as an air deflector.

FIG. 4 shows an alternative embodiment using a single adjustable deflector 118 in the shape of a half torus (a hollow half donut shape), suspended below the wall 34 of the duct 12 by cables 120 shown attached to the duct wall 34 by anchorages 122, the cables shown passing under the torus 118. Again, the fans 22 and 24, motors 18 and 20 and miscellaneous other parts shown in FIG. 1 are not shown in FIG. 4 for ease of illustration, but are included in the operational aircraft. Of course, the deflector 118 of FIG. 4 replaces the deflectors 32 of FIG. 1 for purposes of the FIG. 4 embodiment. The deflector control assembly 50 is connected to the torus 118 by the push-pull rods 76 and serves to position the torus relative to the duct wall 34 in any direction within the toroidal plane so as to intercept greater or lessor portions of the drive air at a selected position around the duct wall and thereby providing roll and pitch control of the aircraft. The servo motors 98 and 100, bearing plate, etc. are supported by supports 124 extending from the interior duct wall.

FIG. 5 serves to illustrate an important embodiment of the present invention wherein a deflector control assembly is defined to include individual servo motors 126 positioning the adjustable deflectors 44. Although the figure is drawn to show only the air duct 12, deflector assemblies 32 and motors 126 for ease of illustration, the other parts shown and discussed relative to FIG. 1 are also to be included in the operational aircraft.

The use of an independent servo motor for each deflector assembly is an important feature in that unlike the embodiments of FIGS. 2–4, all of the adjustable deflectors 44 can be retracted at the same time allowing maximum drive air for vertical propulsion. Separate control over each deflector can then result in the minimum of air deflection necessary for a given required maneuver. The motors 126 are all connected to the flight computer 52 for receiving control signals through lines 128. An added benefit of individual motors 126 for each deflector assembly 34 is a redundancy of control, providing an added safety feature.

The above discussed embodiments including descriptions of certain construction methods are given by way of illustration, but many other ways of fabricating the various parts such as servo motors, linkages, supports, etc will be apparent to those skilled in those arts. It is therefore intended that the following claims be interpreted as covering all such alterations and modifications as fall within the true spirit and scope of the invention.

What is claimed is:

1. A vertical take-off and landing aircraft comprising:

air duct means including a duct wall having a duct periphery, and air intake at a top end and an air exhaust at a bottom end;

first fan means mounted within said air duct means including a plurality of fan blades driven by a first motor means in a clockwise direction for pulling drive air into said duct means from said air intake end and pushing said drive air out said exhaust end;

second fan means mounted coaxially with said first fan means within said air duct means including a plurality of fan blades driven by a second motor means in a counterclockwise direction for pulling air into said duct means from said air intake end and pushing it out said exhaust end;

a plurality of adjustable trough shaped air deflector means positioned exterior to and along the periphery of said air duct means at said exhaust end;

aircraft control means including deflector control means for adjusting said adjustable trough shaped air deflector means responsive to control signals for providing roll and pitch control of said VTOL aircraft; and fan control means responsive to control signals for adjusting the speed of said first and second fans for generating required drive air, and for adjusting the relative speed of said first fan to said second fan thereby causing yaw control of said VTOL aircraft.

2. A VTOL aircraft as recited in claim 1 wherein said adjustable trough shaped air deflector means includes a plurality of air deflector assemblies spaced about said a duct periphery, an having an adjustable deflector means, positionable to intercept and deflect a selected amount of said drive air and a stationary deflector means rigidly attached to said duct wall for directing said selected amount of drive air upward along an exterior of said duct wall towards said top end.

3. A VTOL aircraft as recited in claim 1 wherein said adjustable trough shaped air deflector means includes continuous rigid trough means having a periphery dimensionally equal to said duct periphery; and means for flexibly suspending said continuous rigid trough means from said duct means;

whereby said trough means is responsive to said deflector control means to adjust said trough periphery relative to said duct periphery so as to intercept a greater or lessor amount of said drive air at a selected position along said duct periphery resulting in control of roll and pitch of said VTOL aircraft.

4. A VTOL aircraft as recited in claim 2 wherein said deflector control means includes individual servo motor means for each one of said plurality of adjustable deflector means.

5. A VTOL aircraft as recited in claim 2 wherein said deflector control means includes plate means having first and second orthogonal guide slots therein;

bearing plate means;

bearing means for assisting said plate means to move on said bearing plate;

first arm means having pin means at a first end of said arm means for guiding in said first guide slot;

second arm means having pin means at one end for guiding in said second guide second guide slot;

first servo motor means connected to a second end of said first arm means, said first servo motor means mounted to said bearing plate;

second servo motor means connected to a second end of said second arm means, said second servo motor means mounted to said bearing plate;

means for supporting said first and second servo motor means relative to said air duct;

a plurality of push-pull rod means, one each interconnected to one each of said adjustable deflector means;

whereby said first and second servo motor means are responsive to said deflector control means to rotate said first and second arms to cause said pin means to move said plate means causing said push-pull rod means to adjust said adjustable deflector means.

6. A VTOL aircraft as recited in claim 1 wherein said aircraft control means further includes antenna means for receiving radiated signals from a remote transmitter;

receiver means responsive to said radiated signals to generate corresponding digital signals;

flight computer means responsive to said digital signals for providing said control signals.

7. A VTOL aircraft as recited in claim 1 wherein said aircraft control means further includes attitude sensor means for providing attitude indicating signals; flight computer means responsive to said attitude indicating signals for generating said control signals.

8. A VTOL aircraft as recited in claim 1 wherein said aircraft control means further includes tether means for conducting tether signals from a remote operator to said VTOL aircraft;

flight computer means responsive to said tether signals to generate said control signals.

9. A VTOL aircraft as recited in claim 3 wherein said deflector control means includes plate means having first and second orthogonal guide slots therein;

bearing plate means;

bearing means for assisting said plate means to move on said bearing plate;

first arm means having pin means at a first end of said arm means for guiding in said first guide slot;

second arm means having pin means at one end for guiding in said second guide second guide slot;

first servo motor means connected to a second end of said first arm means, said first servo motor means mounted to said bearing plate;

second servo motor means connected to a second end of said second arm means, said second servo motor means mounted to said bearing plate;

means for supporting said first and second servo motor means relative to said air duct;

a plurality of push-pull rod means, one each interconnected to one each of said adjustable deflector means;

whereby said first and second servo motor means are responsive to said deflector control means to rotate said first and second arms to cause said pin means to move said plate means causing said pushpull rod means to adjust said adjustable deflector means.

10. A VTOL aircraft as recited in claim 4 wherein said aircraft control means further includes antenna means for receiving radiated signals from a remote transmitter;

receiver means responsive to said radiated signals to generate corresponding digital signals;

flight computer means responsive to said digital signals for providing said control signals.

11. A VTOL aircraft as recited in claim 4 wherein said aircraft control means further includes tether means for conducting tether signals from a remote operator to said VTOL aircraft; flight computer means responsive to said tether signals to generate said control signals.

12. A VTOL aircraft as recited in claim 5 wherein said aircraft control means further includes antenna means for receiving radiated signals from a remote transmitter;

receiver means responsive to said radiated signals to generate corresponding digital signals;

flight computer means responsive to said digital signals for providing said control signals.

13. A VTOL aircraft as recited in claim 5 wherein said aircraft control means further includes tether means for conducting tether signals from a remote operator to said VTOL aircraft; flight computer means responsive to said tether signals to generate said control signals.

14. A VTOL aircraft as recited in claim 9 wherein said aircraft control means further includes antenna means for receiving radiated signals from a remote transmitter;

receiver means responsive to said radiated signals to generate corresponding digital signals;

flight computer means responsive to said digital signals for providing said control signals.

15. A VTOL aircraft as recited in claim 9 wherein said aircraft control means further includes tether means for conducting tether signals from a remote operator to said VTOL aircraft;

flight computer means responsive to said tether signals to generate said control signals.

* * * * *

UNITED STATES PATENT AND TRADEMARK OFFICE
CERTIFICATE OF CORRECTION

PATENT NO.    : 6,450,445 B1
DATED         : September 17, 2002
INVENTOR(S)   : Paul S. Moller It is certified that error appears in the above-identified patent and that said Letters Patent is hereby corrected as shown below:

<u>Title page, Item [54] and Column 1, line 2,</u>
Title, "ROBTIC OR REMOTELY CONTROLLED" should read: -- ROBOTIC OR REMOTELY CONTROLLED --.

<u>Column 4,</u>
Line 42 reads, "adjustable deflectors with the plate 76 in a centered position" it should read: -- adjustable deflectors with the plate 74 in a centered position --.

<u>Column 5,</u>
Line 29 reads, "periphery, and air intake at a top end and an air exhaust" it should read: -- periphery, an air intake at a top end and an air exhaust --
Line 55 reads, "thereby causing yaw control of said VTOL aircraft." it should read: -- thereby enabling yaw control of said VTOL aircraft. --;
Line 58 reads, "plurality of air deflector assemblies spaced about said a duct" it should read: -- plurality of air deflector assemblies spaced about said duct --;
Line 59 reads, "periphery, an having an adjustable deflector means, posi-" it should read: -- periphery having an adjustable deflector means, posi- --.

<u>Column 6,</u>
Line 6 reads,: "said duct periphery so as to intercept a greater or lessor" it should read: -- said duct periphery so as to intercept a greater or lesser --.

Signed and Sealed this

First Day of June, 2004

JON W. DUDAS
*Acting Director of the United States Patent and Trademark Office*